United States Patent
Spence et al.

(10) Patent No.: US 6,591,277 B2
(45) Date of Patent: Jul. 8, 2003

(54) DYNAMIC OBJECT PERSISTENCE

(75) Inventors: John Stanley Spence, Wellington (NZ); Stephen Kurlow, Cherrybrook (AU)

(73) Assignee: International Business Machines Corporation, Armonk, NY (US)

( * ) Notice: Subject to any disclaimer, the term of this patent is extended or adjusted under 35 U.S.C. 154(b) by 162 days.

(21) Appl. No.: 09/749,188

(22) Filed: Dec. 27, 2000

(65) Prior Publication Data

US 2001/0018689 A1 Aug. 30, 2001

(30) Foreign Application Priority Data

Dec. 27, 1999 (JP) .......................... 11-370488

(51) Int. Cl.⁷ ............................. G06F 17/30; G06F 9/45
(52) U.S. Cl. .................. 707/103 R; 707/100; 707/101; 707/102; 707/104.1; 707/395; 707/701; 707/702; 707/705; 707/708
(58) Field of Search ................. 707/103 R, 8, 707/100, 101, 102, 104.1; 395/683, 701, 702, 705, 708; 714/20; 717/3

(56) References Cited

U.S. PATENT DOCUMENTS 5,692,183 A * 11/1997 Hapner et al. .......... 707/103 R
5,701,484 A * 12/1997 Artsy ........................ 395/683
5,727,203 A * 3/1998 Harpner et al. ......... 707/103 R
5,848,419 A * 12/1998 Hapner et al. ............. 707/103
5,940,827 A * 8/1999 Hapner et al. ............... 707/8
6,430,703 B1 * 8/2002 Connor et al. ............. 714/20
6,442,748 B1 * 8/2002 Bowman-Amuah ............ 717/3

FOREIGN PATENT DOCUMENTS

EP         0735465 A1 * 10/1996       ............. G06F/9/44
EP         0735473 A2 * 10/1996       ............. G06F/9/46

* cited by examiner

Primary Examiner—Frantz Coby
(74) Attorney, Agent, or Firm—Scully, Scott, Murphy & Presser; Manny W. Schecter, Esq.

(57) ABSTRACT

Methods and apparatus for persisting objects to a database are disclosed. A set of meta-level objects (120) are defined, each object also having defined a persistence strategy. Each object also has a set of attributes which have their own respective persistence strategy. An object also can have an association with other objects each carrying respective persistence and attribute definitions. Upon a persistence request occurring, a run-time instance of an object is created carrying attributes and attached persistence strategies. The instantiated object is then executed. By defining objects, attributes and persistence strategies at a meta-level that only are populated at run-time, they each are able to be readily modified to give effect to a desired change in persistence strategy, including which attributes are to be persisted.

9 Claims, 13 Drawing Sheets

DYNAMIC OBJECT PERSISTENCE

BACKGROUND OF THE INVENTION

1. Technical Field

This invention relates to Object Oriented programing, and particularly to the persistence of instances of dynamic objects.

2. Prior Art

When data structures are defined in object terms, the usual manner in which the 'class' of objects can be changed or extended is by making programing code changed which requires recompiling. This is the case for 'static' objects that are hard coded. Any form of recompiling is undesirable in 'live' computing systems because of the associated 'down time'. It is thus desirable to implement class and attribute definitions that obviate the need to recompile code. This can be achieved by the implementation of dynamic objects. Dynamic objects are defined at a meta-level, and have attributes associated with the constituent classes at run-time. In this way, changes can be made to the underlying structure of an object in the meta-level domain, thereby not requiring recompilation. By way of additional background information, principles of Object Oriented programing are described in: "The Unified Modeling Language Reference Manual" by James Rumbaugh, Ivar Jacobsen and Grady Booch, published by Addison-Wesley, December 1998 (ISBN 0-201-30998-X).

Objects are generic in nature and the characteristics of an object are only known at run-time when an instance of an object is instantiated making persistence problematic, given that the object's attributes/characteristics must be known in order to perform the persistence. Additionally, where there is more than one form of data store or database, an object instance must be able to be configured and directed to each form with ease.

A prior arrangement is disclosed in Published Japanese Patent Application No. 6-67856 (PFU Limited, Murota Norie), published on Mar. 11, 1994. This disclosure teaches the linkage of processing modules, independently of their structure, through use of a management table that can assimilate different data file structures. This strategy is limited to tabled-based database systems, and cannot accommodate structured data types such as composites, arrays and sequences.

The present invention seeks to overcome or at lest ameliorate problems in the prior art.

SUMMARY OF THE INVENTION

According to one aspect, the invention provides a method for persisting objects to a database, the method comprising the steps of:

(a) defining a meta-level object;

(b) defining a persistance strategy for said object;

(c) defining one or more attributes for said object;

(d) defining a persistence strategy for one or more of said attributes;

(e) instantiating an object that carries its persistence strategy and its attributes with their respective persistence strategies; and (f) servicing said instantiated object.

According to another aspect, the invention provides a method for specifying a persistence framework for objects, the method comprising the steps of:

(a) defining a meta-level object;

(b) defining a persistence strategy for said object;

(c) defining one or more attributes for said object; and (d) defining a persistence strategy for one or more of said attributes.

The persistence strategy can include both storage and retrieval actions. Each persistence strategy can be defined for a definition time and a runtime.

According to another aspect, the invention provides an object persistence framework comprising;

an object definition;

an object persistence definition therefor;

one or more attributes for each object; and a persistence strategy definition for one or more of said attributes.

The framework can further comprise an intermediary function linking the object definition with the attribute definitions. There can further be a number of associated object definitions associated with the first, each having respective persistence definitions and attributes.

According to yet another aspect, the invention provides a client-server computing system, comprising:

(a) a plurality of client computers each having processor means implementing an application layer, and a memory storing a set of meta-level objects, a persistence strategy definition for each said object, one or more attributes for each said object, and a persistence strategy for one or more of said attributes.

(b) a plurality of server computers, each having processor means implementing an application layer, and a memory storing a set of meta-level objects, a persistence strategy definition for each said object, one or more attributes for each said object, and a persistence strategy for one or more of said attributes.

(c) a database being accessible by said server computers; and (d) a communications link interconnecting said client machines with said server machines; and wherein, in response to a persistence command, one or either said client computers and/or server computers instantiates an object from amongst said set that carries with it its persistence strategy and its attributes with their respective persistence strategies, to be persisted in said database.

BRIEF DESCRIPTION OF THE DRAWINGS

Preferred embodiments of the present invention will now be described, by way of example only, with reference to the accompanying drawings, in which.

DETAILED DESCRIPTION OF THE PREFERRED EMBODIMENTS OF THE INVENTION

Representative Application Platform

Figure 1:
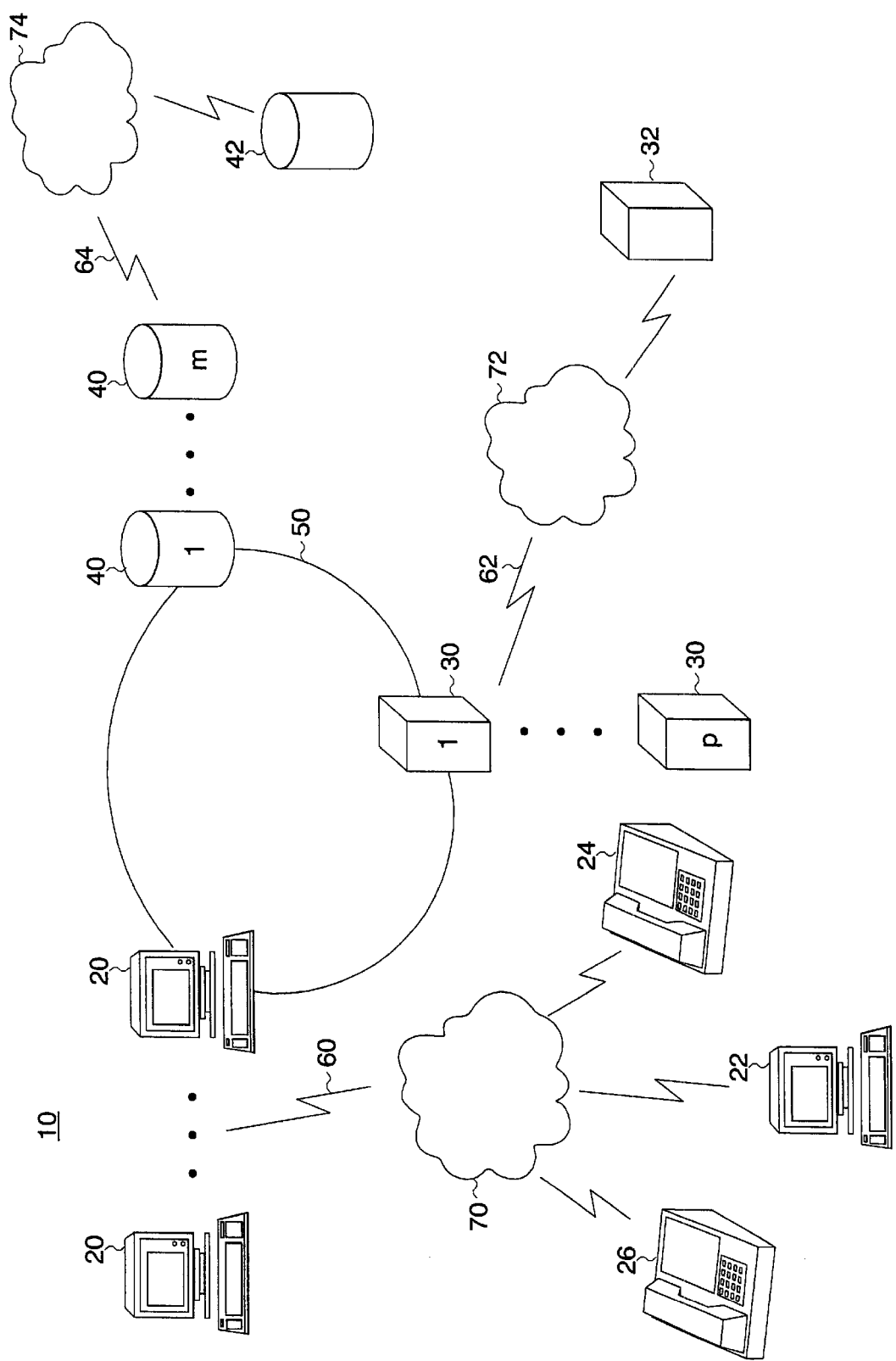
FIG. 1 is a representative topology of a three tier computing system requiring object persistence.

FIG. 1 is a representative topology of a three tier computing system 10. The presentation (or client/user) tier is represented by a number (1 . . . n) of workstations 20, that can be appropriate computing terminals, for example personal computers. The business tier is represented by a number (1 . . . p) of servers 30, that can be dedicated mini or mainframe computers. The data tier is represented by a number (1 . . . m) of databases 40, which can include dynamically managed magnetic or optical storage media where instances of objects.

The computing system 10 is of an 'open' design, providing communication links 60, 62, 64, via external networks 70, 72, 74 to like-devices 22, 32, 42 and remote telephone terminals 24, 26.

The workstations 20, servers 30, and databases 40 are interconnected by a Local or Wide Area Network (LAN or WAN) 50. The LAN/WAN 50 carries information passing between each of the three basic elements described.

Such computing systems 10 find application in many and varied fields, ranging from university research and teaching facilities to business applications. In fact, almost every business will utilize such a system to transact its functions and serve its clients. For example, a system may be used to control inventory, for word processing and accounts purposes, and for servicing client's enquiries. Many businesses have very large client bases and may provide an extensive inventory of goods and services. One illustrative example is a telecommunications service provider (Telco) that serves a countrywide client base. The Telco's subscribers thus can number in the millions, and each customer will expect an immediate response from a Customer Service Representative (CSR) to any inquiry, which can range from billing information, a request for a new service, or the placing of orders for a product.

Similar examples are seen in Utilities, insurance companies, banks, hospitals, law firms, accountancy firms, stock exchanges, universities and Government agencies, to name but a few.

Consider the example of a Telco operating across many States of the United States. Such a Telco will typically support local, regional, interstate and international voice and data calls, as well as cellular mobile voice and data traffic. Customers of the Telco can choose from a wide range of goods and services including, for example, the installation of second phone/fax/Internet lines, call forwarding, and messaging. They also will expect to be able to make enquiries of CSRs stationed at the workstations 20 concerning billing and service faults. It is not unreasonable to expect a modern-day Telco to have at least 1 million customers, typically requiring at least 500 CSRs. A Telco system infrastructure of this size can expect to handle about 15,000 business transactions per hour. For each business transaction there may be 6 CSR machine transactions required, and each individual machine transaction can involve up to 20 database transactions. The number of objects to be persisted can be 1.5 million per hour.

To give a better example of the size of computing hardware required to achieve such performance, it is considered that the CSR workstations 20 should be Pentium™ personal computers running the Windows NT™ operating system, the servers 30 can be one or more IBM UNIX™-based 12-way RS6000™ S-70 machines, and the databases would require a capacity of about 40 Gbytes, managed by an Oracle™ or IBM DB-2™ system. There would, of course, be other operational LAN/WAN servers required to handle data communications, as would be readily understood by a person skilled in the art.

Generalized Client-Server Architecture

Figure 2:
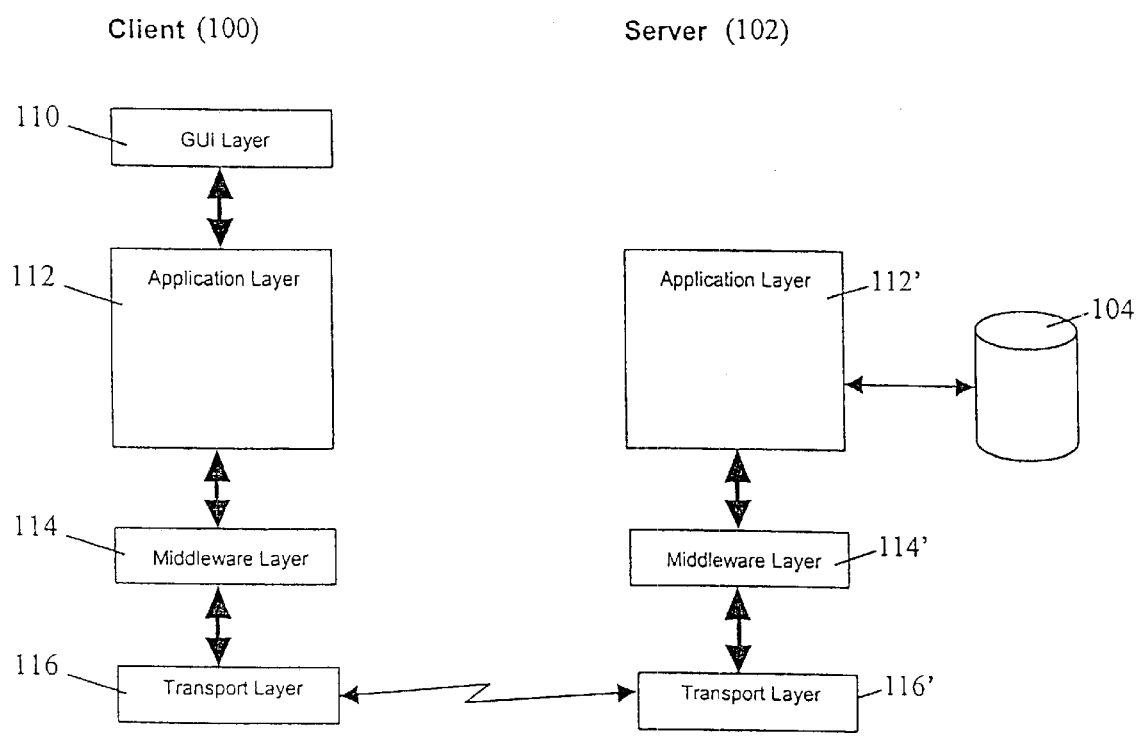
FIG. 2 shows a simplified client-server architecture.

FIG. 2 shows a generalized computing architecture for a client-server system. The client process 100 can be a workstation 20 as shown in FIG. 1, with the server process 102 being any one of the server machines 30, also shown in FIG. 1. In a similar way, the database 104 can represent one of the datastores 40 shown in FIG. 1. Equally, however, the client process 100 and server process 102 could reside on a single machine (for example, a single server machine 30).

On the client machine 102, a Graphical User Interface (GUI) layer 110 provides the human-machine interface for a user. The GUI layer interfaces with an application layer 112, where the specific computing operation or purpose performed by the client-server system resides. The application layer interfaces with a middleware layer 114 that handles aspects such as system resource usage, operating system locks, shared memory access, container services, queuing services, transaction services, logical unit of work coordination, inter-process communications, user access control services, and configuration retrieval services. The middleware layer 114 represents the operating system and communications services. In an Object Oriented environment, objects are instantiated by the middleware in response to service requests. The transport layer 116 of the client machine 100 is in network communication with the server 102, usually transmitting a binary string representation of an object. The server process 102 replicates the transport layer 116', the middleware layer 114', and the application layer 112' functions.

The middleware layer 114, 114' can be, for example, any one of the CICS™, ENCINA™ or CBConnector™ products of International Business Machines Corporation.

The respective application layers 112, 112', can be implemented by the UNIX™ operating system. For the server application layer 112, 112', there is the additional database process, which can be any convenient relational database, such as the DB2™ product of International Business Machines Corporation. The database 104 is accessed via SQL call commands.

A service request arises on the client and is passed to the server where it is executed by the application layer. Most service requests will require database access, either to retrieve or store data.

Overview

The invention allows the persistence of an object that contains data into one or more different persistent store types with one or more different persistence physical structures. An advantage of this invention is that at run-time an application has late-binding where it can define in the meta-model how instances of a meta-model object will be persisted without needing to embed the application with early-binding of the object's physical persistence structure.

The invention separates the meta-model from the instance-model. Application programs only have knowledge of the instance-model. The meta-model allows the definition instances of one or more different persistent store types with one or more different persistent physical structures and name them. Within an application, at run-time, it is possible to choose one of those names and request an instance-model object to be persisted. The meta-model allows one of three types of persistant stores to be used for each named store being "Profile" (a formatted flat file with non-application known physical structure), StaticSql (DB2™ Static SQL with non-application known physical database structure), and Dynamic Sql (DB2™ Dynamic SQL with a possibly known application physical database structure). Thus an application has late-binding terms of the physical structure of a persistent store type and only knows to refer to a named meta-model persistent store when persisting an instance-model object. This provides decoupling of an application's persistant storage mechanism for its instance-model objects to have late-binding, thereby allowing the persistent structure of its instance-model objects to be changed without recompiling the relevant using application.

It is to be understood that the following description of object, attribute, named attribute, and persistence strategy definitions will occur (be held) on both the client and server. A persistence request can arise on a client, or on a server (in response to a client servicing request, for example).

Dynamic Objects and Persistence

Objects, or more correctly 'instances of objects', perform the database accesses relating to storage and retrieval. An object is defined to carry with it a strategy for storage and retrieval. An object for use in a computer system such as that shown in FIG. 1 is created at 'definition time', and instantiated (i.e. made an instance of) at run-time. A defined class of object can also be amended or changed at an intermediate 'maintenance-time'.

Figure 3:
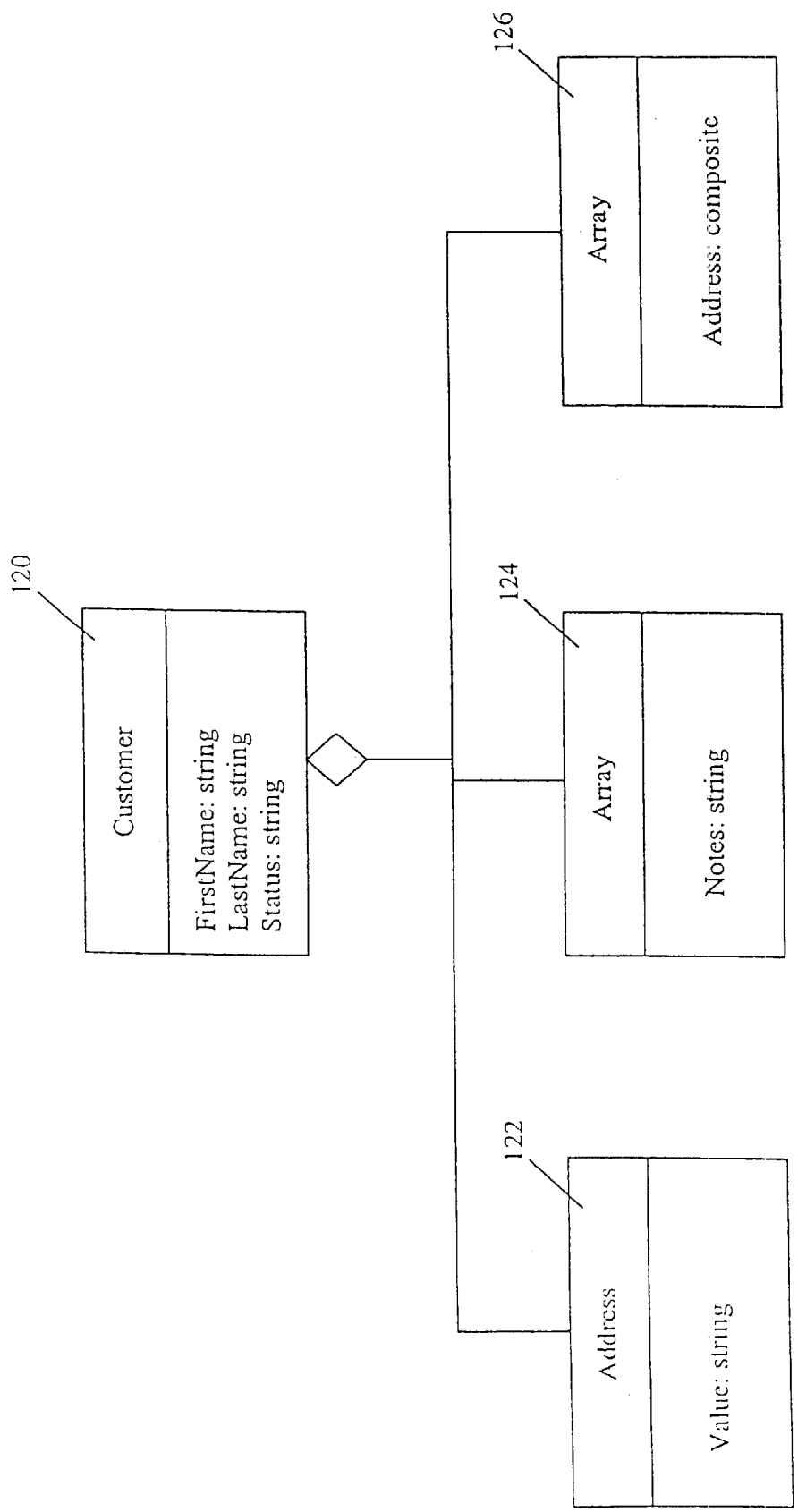
FIG. 3 is an object class diagram for a 'Customer' object.

FIG. 3 shows a meta-level class diagram for a meta level object "Customer", that is created in definition time. The class "Customer" 120 has the attributes "FirstName", "LastName", and "Status". These attributes are populated with data of type "string" when the object is instantiated at run-time. The Customer class object 120 has an association with other class objects, namely "Address" 122, "NotesArray" 124, and "AddressArray" 126. Each of these associated objects has its own set of attributes, the function of which will be presently described.

An instance of the object Customer is created at run-time using the following code sample:

```
FwkMdlPtr<FwkMdlDynamicObjectDefinition>
MyCustomerDef(FwkMdlDynamicOjbectDefinition::get
    Registry( )-
    >create("Customer")
myCustomerDef->setFlags(69);
myCustomerDef->setEffectiveDate(FwkDate("1998-01-
    01"));
myCustomerDef->setExpiryDate(FwkDate("2000-02-
    02"));
```

Such an object is 'dynamic' in the sense that it only takes its attributes at run-time, and the attributes can be changed (i.e. they are non-static).

For each class of dynamic object, the following information needs to be defined:

(a) The database name in which a dynamic object is to be persisted.

(b) The type of strategy used to persist the dynamic object (i.e. Profile, StaticSql, DynamicSql).

(c) The table name in which the object is to be stored—a unique table name is required for each type.

For each attribute that is defined for a class of dynamic object the following definition must occur:

(d) The column name in which this attribute is to be stored—a unique column name is required for each attribute.

1. Dynamic Object and Persistance Strategy Definition

A dynamic object, such as "Customer" defined above, requires storage and retrieval strategies for each of definition time, maintenance time and run-time. In that case, it is necessary that an instance of a strategy definition is created and initialized for each stage. For definition time, a code sample is:

```
FwkMdlPtr<FwkMdlStrategyDefinition>MyCustomer
    StrategyDef(FwkMdlStrategyDefinition::getRegi-
    stry ( )->create("Definition") myCustomerStrategy
    Def->setStorageStrategyRefName ("Definition");
myCustomerStrategyDef->setStorageStrategyTypeFwk
    Mdl StrategyDefinition::Profile);
myCustomerStrategyDef->setStorageDatabaseName
    ("Voyager.ini");
myCustomerStrategyDef->setStorageTableName
    ("DynamicObjectDefinition");
myCustomerStrategyDef->setStorageColunName
    ("NA"); // this line is not necessary for a dynamic
    object definition storage strategy
myCustomerStrategyDef->setRetrievalStrategyType
    FwkMdlStrategyDefinition::Profile);
myCustomerStrategyDef-setRetrievalDatabaseName
    ("Voyager.ini");
myCustomerStrategyDef->setRetrievalTableName
    ("DynamicObjectDefinition");
myCustomerStrategyDef->setRetrievalColumnName
    ("NA"); // this line is not necessary for a dynamic
    object definition retrieval strategy
myCustomerDef->getStrategys( )->putObject
    myCustomerStrategyDef);
```

The maintenance and run-time strategies are set up in a similar manner with the strategy reference name, StorageStrategyRefName, set to 'maintenance' and 'run-time' respectively.

In the above code sample, the strategy type has been set to "::Profile". This term refers to a flat file but can, in some implementations, be a Windows™ .ini file. There are two other strategy types: StaticSql and DynamicSql, that will presently be described. The last line of the code sample adds the storage and retrieval strategy to the Customer object definition's myDynObjDef strategies.

2. Attribute and Named Attribute Definition

In FIG. 3, a "string" attribute type is used. This type also needs to be created and initialized, as illustrated in the following code sample:

```
FwkMdlPtr<FwkMdlAttributeDefinition>MyStringDef
    (FwkMdlAttributeDefinition::getRegistry( )->create
    ("String") myStringDef->setAttributeName
    ("String");
myStringDef->setType ("IString");
```

The attribute "string" is defined in terms of the internal StringClass. Only a definition and maintenance time storage and retrieval strategy need to be defined for this attribute definition. The storage and retrieval strategy must be added to the storage and retrieval strategy list of the attribute definition instance myStringDef. This is done in the manner described for definition of the dynamic object, where the table name is defined as "AttributeDefinition".

To tie the attribute definitions to the dynamic object definition an association class is used, called the NamedAttributeDefinition. The objects of this class contain a string name which represents where an attribute fits within the structure of the dynamic object.

```
FwkMdlPtr<FwkMdlNamedAttributeDefinition>My
    FirstNameAttrDef(FwkMdlNamedAttribute
    Definition::getRegistry( )->create("Customer½First
    Name#String");
``` myFirstNameNamedAttrDef->setName("FirstName");

myFirstNameNamedAttrDef->setAttributeComposite Name("Customer|First Name#String");

myFirstNameNamedAttrDef->setValue("Needs Name"); // used as the default value

In the code sample, a named attribute definition is constructed. The short name for this named attribute definition is "FirstName". The composite name, in the definition, indicates the placing of the FirstName attribute within the dynamic object class. The FirstName attribute is contained directly within the Customer dynamic object and has an attribute type of "String". The syntax for the composite name is DynamicObject {'|' Attribute '#'}.

The other two string-type attributes, LastName and Status, are set up in much the same way as FirstName, except that the composite name is set to "Customer|Last Name#String" and "Customer|Status#String", respectively. Also the short name is set to "LastName" and "Status" respectively.

3. Attribute Persistence Strategy Definition

A storage and retrieval strategy is also set up for the attributes. If a strategy is not given then the attribute will not be stored or retrieved. Thus, it is possible to control/choose which attributes are to be persisted, and which are not. Defining a strategy for the named attributes is very similar to defining a strategy for the dynamic object definition. The storage and retrieval strategy for the "FirstName" attribute, for definition time, is illustrated in the following code sample.

```
FwkMdlPtr<FwkMdlStrategyDefinition>MyFirstName
    StrategyDef(FwkMdlStrategyDefinition::getRegi-
    stry( )->create ("Definition") myFirstNameStrategy
    Def->setStorageStrategyRefName ("Definition");
myFirstNameStrategyDef->setStorageStrategyType
    FwkMdlStrategyDefinition::Profile);
myFirstNameStrategyDef->setStorageDatabasename
    ("Voyager.ini");
myFirstNameStrategyDef->setStorageTableName
    ("NamedAttributeDefinition");
myFirstNameStrategyDef->setStorageColumnName
    ("NA"); // this line is not necessary for a dynamic
    object definition storage strategy
myFirstNameStrategyDef->setRetrievalStrategyType
    FwkMdlStrategyDefinition::Profile);
myFirstNameStrategyDef->setRetrievalDatabasename
    ("Voyager.ini");
myFirstNameStrategyDef->setRetrievalTableName
    ("NamedAttributeDefinition");
myFirstNameStrategyDef->setRetrievalColumnName
    ("NA");
myFirstNameStrategyDef->getStrategys( )->putObject
    (myFirstNameStrategyDef);
```

The maintenance and runtime definitions would be coded with StorageStrategyRfName set appropriately. The StorageColumnName and RetreivalColumnName are set to "NA" since these two fields are only used in stages other than "Definition" and only when the strategy type is set to DynamicSql.

A link from the named attribute definition to the attribute definition must be created. This is shown in the following code sample. The other two attributes, LastName & Status, share the same attribute definition as FirstName and would link to myStringDef also.

```
myFirstNameStrategyDef->getAttribute( )->put
    (myStringDef);
```

4. Associated Object Classes

The Customer object class 120 is a composite, with associated classes Address, NotesArray, and AddressArray. The named attribute definitions for these associated classes are defined in the same manner as for the Customer attributes. The composite names are:

Customer|Address#Composite,

Customer|NotesArray#Array,

Customer|AddressArray#Array.

For the non-string types, only a strategy for the Definition stage need be created. This is due to the fact that instances of non-simple attributes cannot be store or retrieved.

The composite Address has contained within it only one attribute. This attribute is "Value" and is of type "string". The composite name in the named attribute definition for Value would be:

Customer|Address#Composite|Value#String.

The array Notes also contains one attribute requiring the composite name to be:

Customer|NotesArray#Array|Notes#String.

For the Address array the named attribute definitions that need to be constructed would require the following composite names:

Customer|AddressArray#Array|Address#Composite

Customer|AddressArray#Array|Address#Composite| Value# String

5. Persistance of Definition Data and Persistence Strategies

The following discussion of meta-level object persistence relates to a precursor to run-time persistence.

Figure 4:
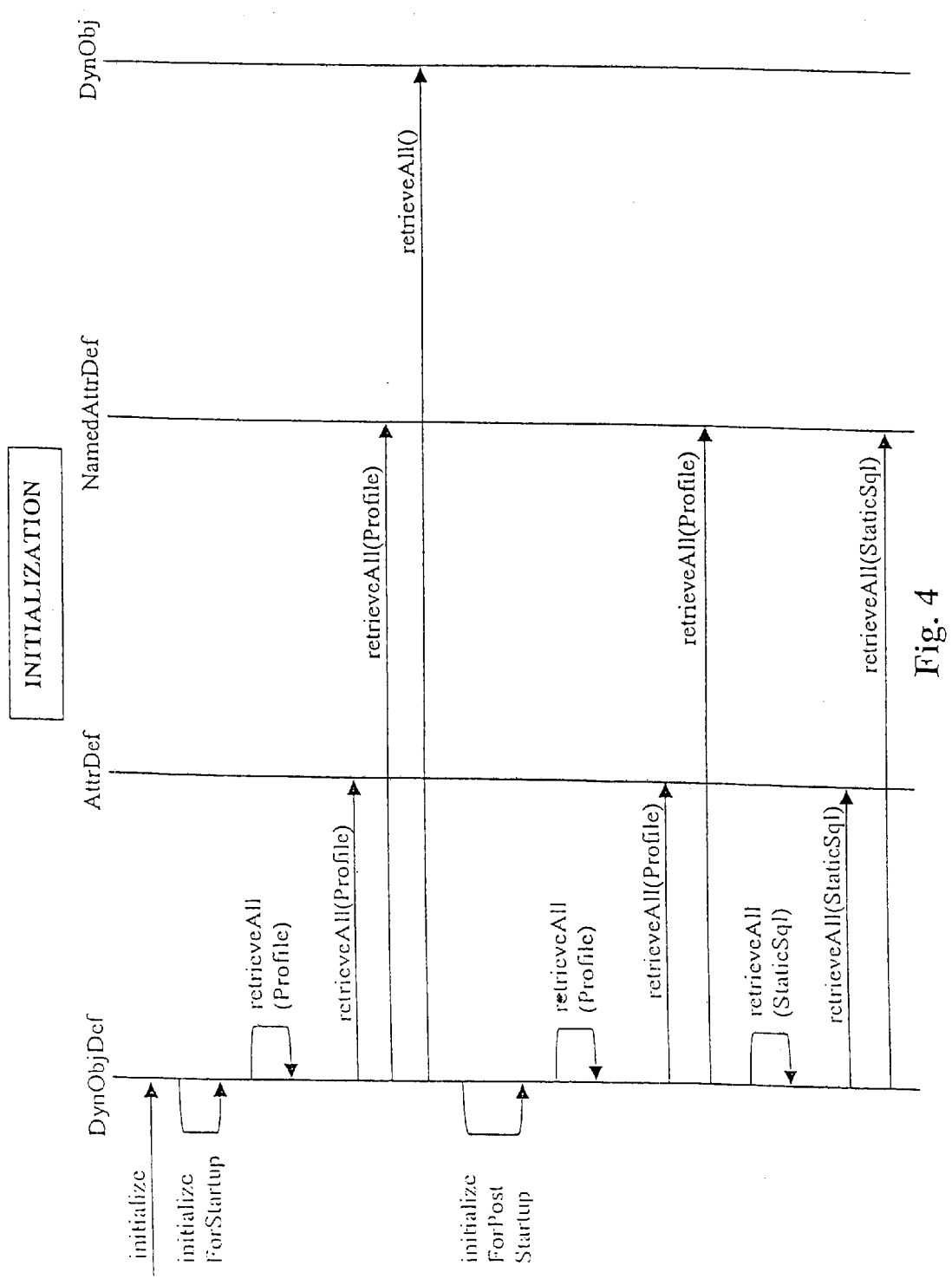
FIG. 4 is an object interaction diagram for an initialization process.

FIG. 4 shows an object interaction diagram of a necessary initialization process, such as on power-up of the computing platform. All classes of dynamic object, attribute and named attribute definitions (having a Profile strategy) are retrieved, together with all stored dynamic object classes. The second part of the initialization, post start up, retrieves all the definitions that are defined for application use, firstly using the Profile strategy, then using the StaticSql strategy.

Figure 5:
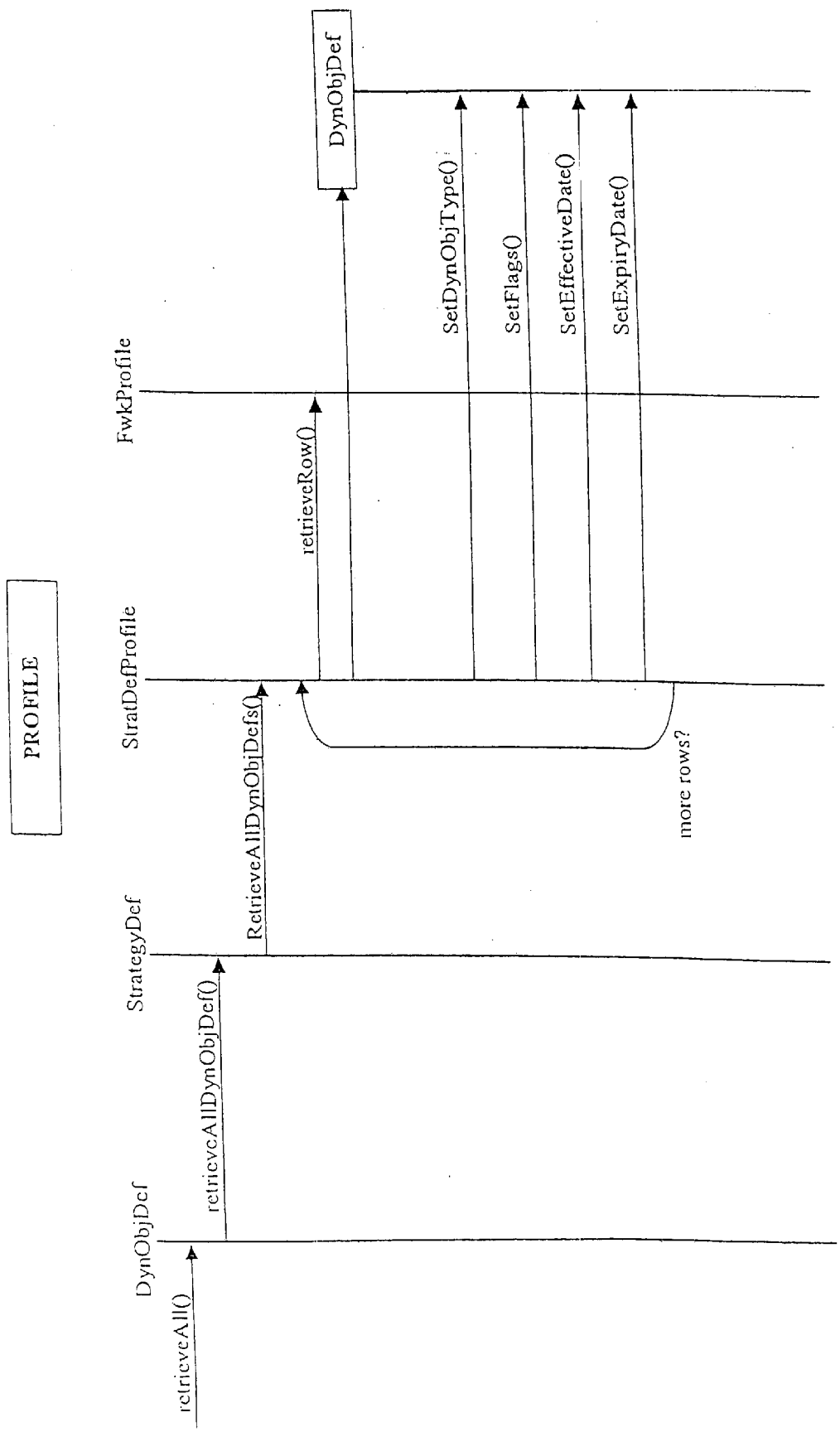
FIG. 5 is an object interaction diagram for meta-level dynamic object persistence.
Figure 6:
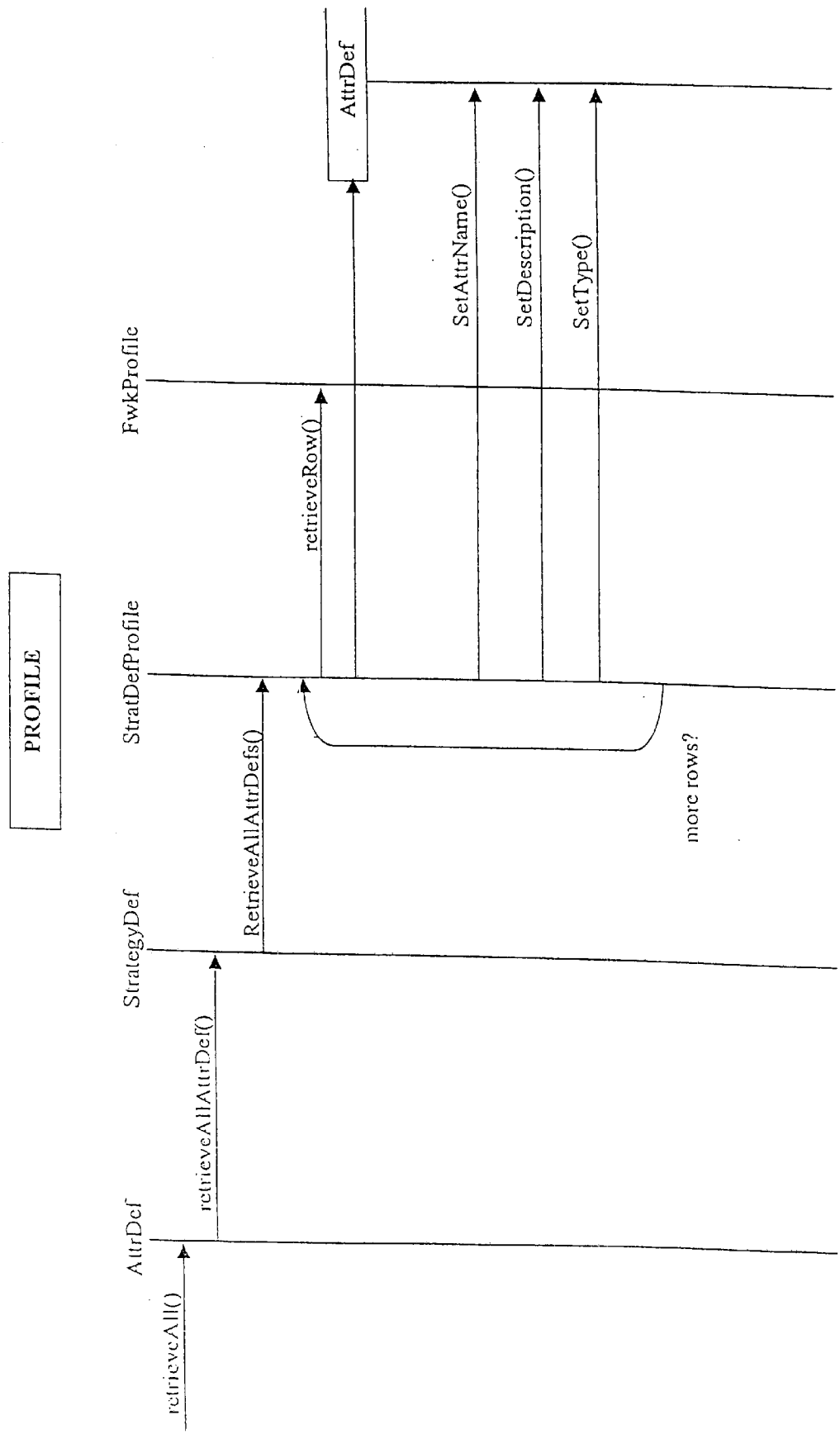
FIG. 6 is an object interaction diagram for meta-level attribute persitence.
Figure 7:
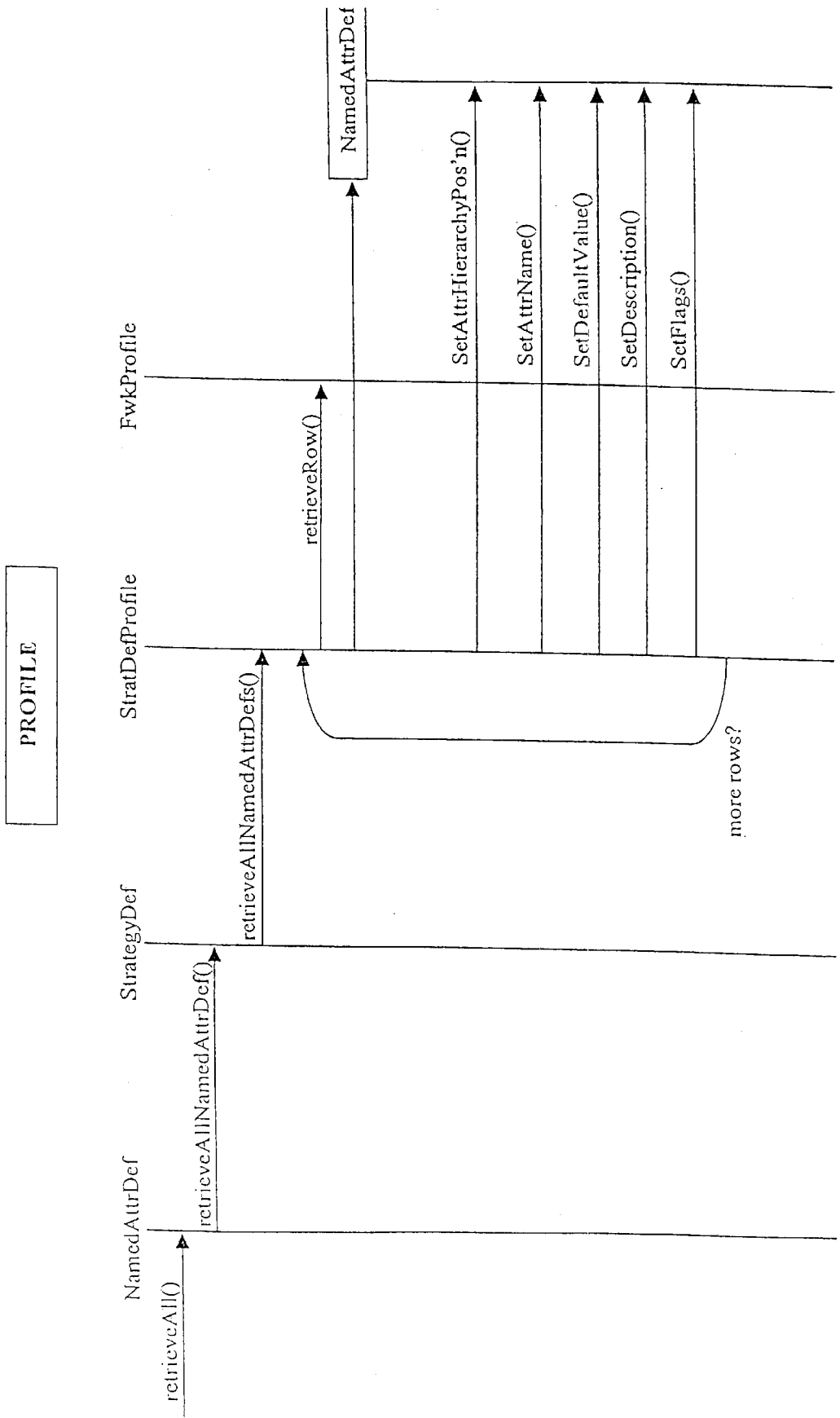
FIG. 7 is an object interaction diagram for meta-level named attribute persistence.

FIGS. 5, 6 and 7 are object interaction diagrams respectively for retrieval of a particular chosen class of dynamic object definition, attribute definition, and named attribute definition using the Profile strategy. Such persistence activity would occur if the desired object class was not held in a cache memory on the client or server machine. As can be noted, the relevant persistence strategy definitions are 'attached' during the interactions.

Figure 8A:
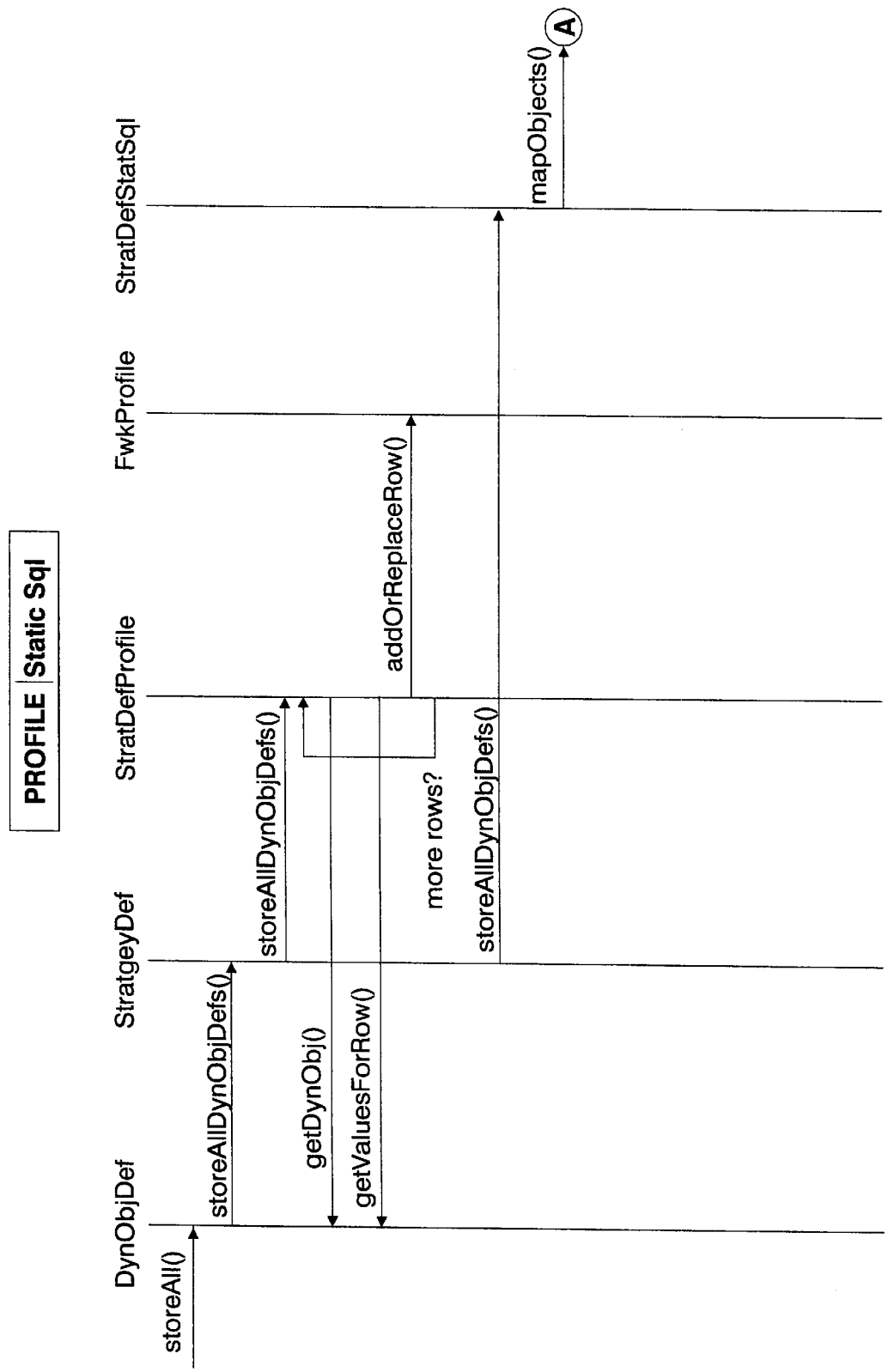
FIG. 8 is an object interaction diagram for meta-level StaticSql storage.
Figure 8B:
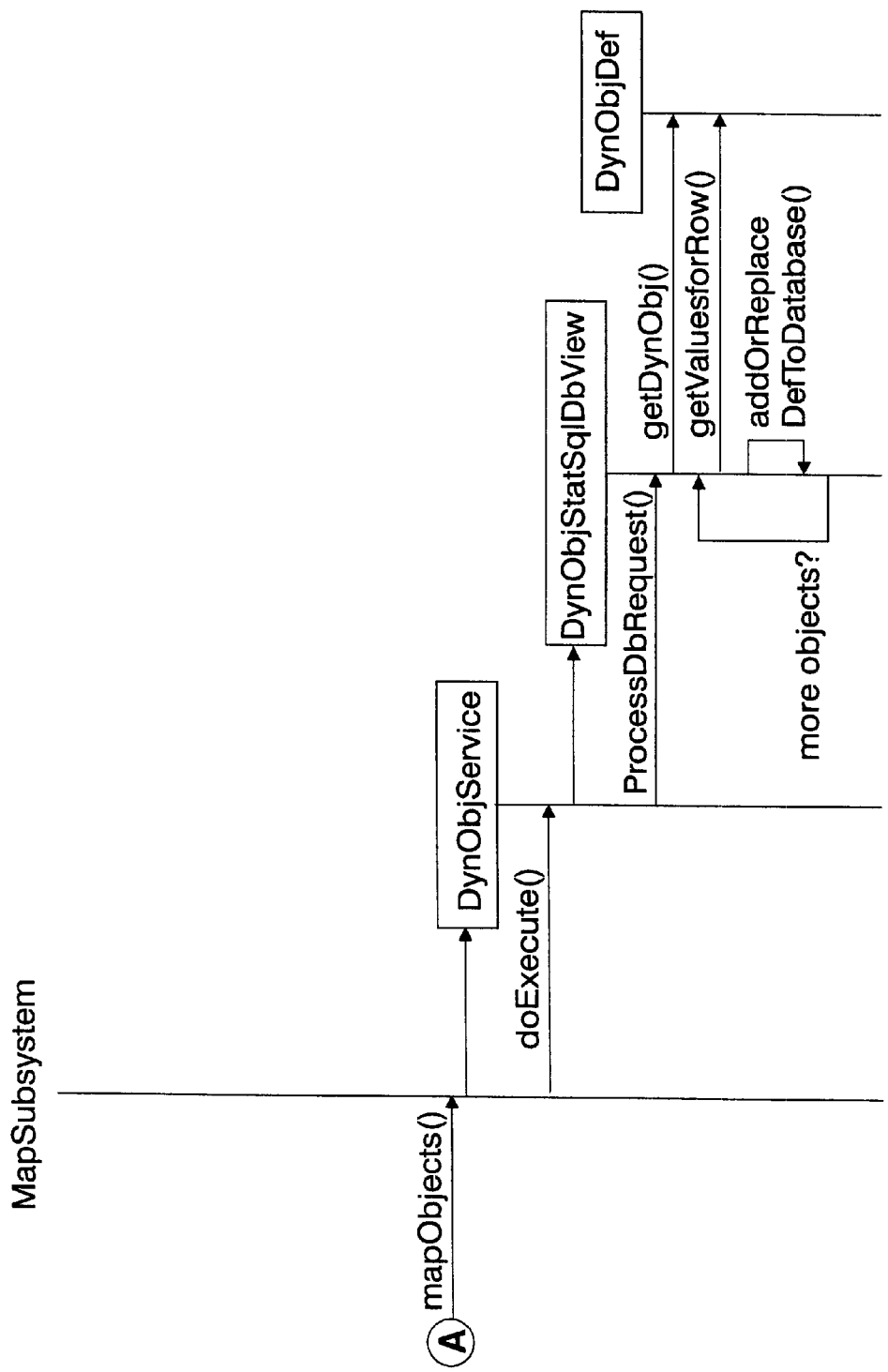

FIG. 8 shows object interactions of a store action occurring for the dynamic object definition by the StategicSql Strategy. The interactions are executed for all defined classes having a Profile strategy definition, then done for those having the StaticSql strategy.

Figure 9A:
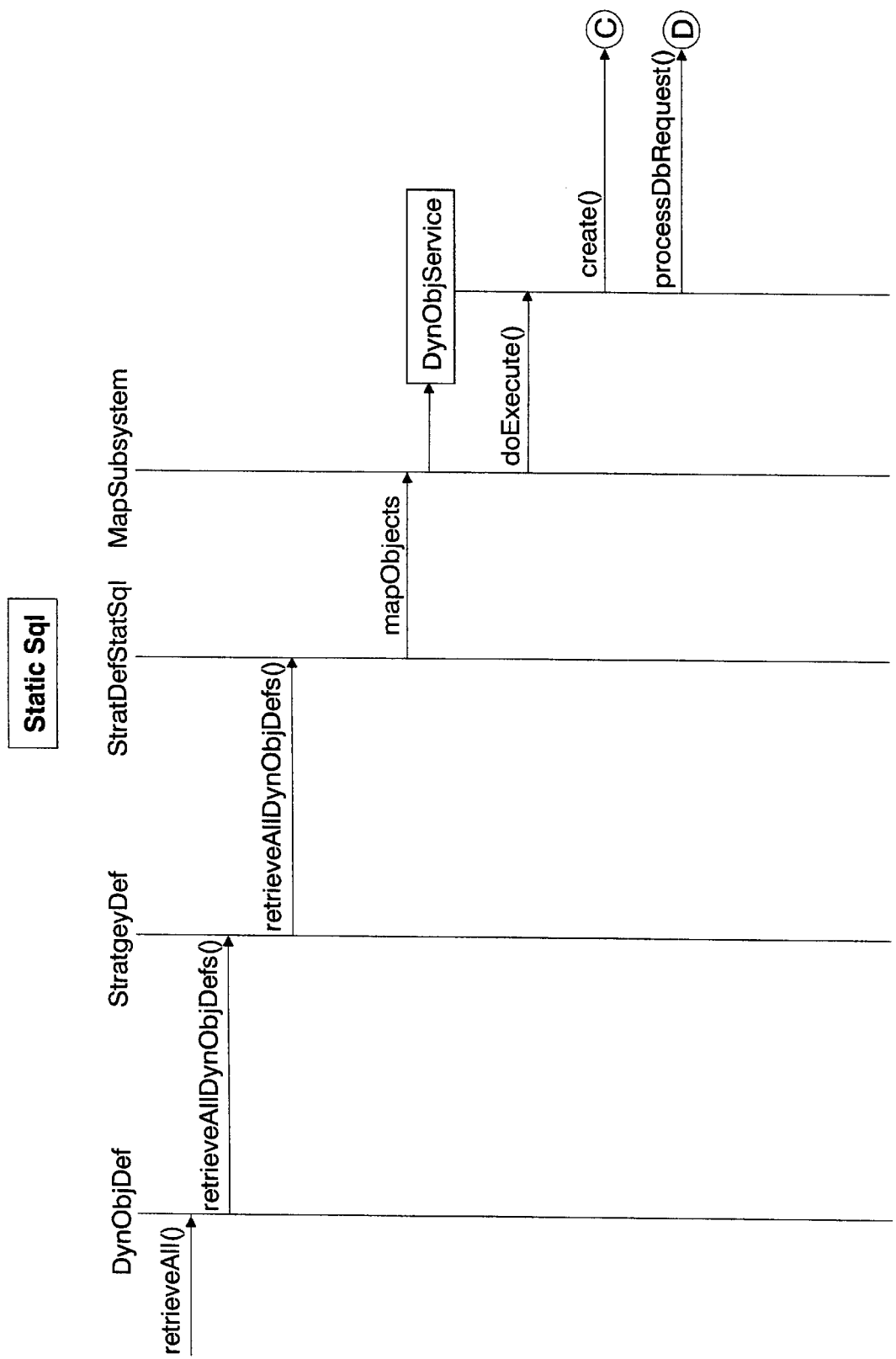
FIG. 9 is an object interaction diagram for meta-level StaticSql retrieval.
Figure 9B:
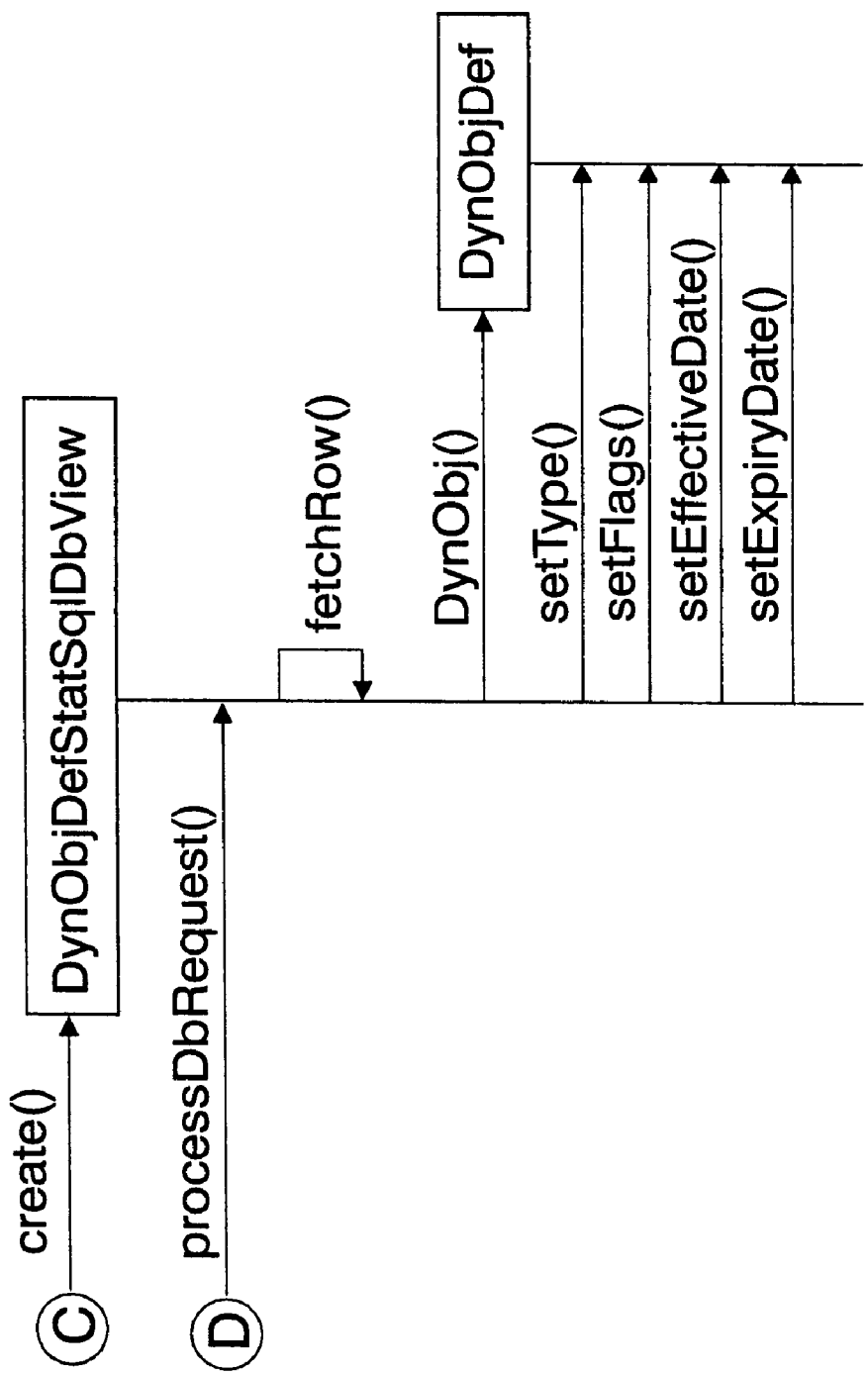

FIG. 9 is a similar interaction diagram for a retrieval action for the dynamic object definition by the StaticSql strategy.

The persistence of the attribute definitions and named attribute definitions is conducted in a similar manner to that for the dynamic object definitions.

The definitions of the chosen set of dynamic objects can persist using either/both the Profile and StaticSql strategy types. If definitions are attempted to be persisted using DynamicSql then this will be internally converted to StaticSql.

The reason for allowing definitions to be persisted using two types is to cater for different network designs that an application runs on. If there is a network between the client and the database server, it will be 'expensive' to persist dynamic objects using the StaticSql or DynamicSql strategy types. Hence, the definition data can be persisted using the Profile strategy type. Alternatively, if there are some definition data that needs to be centrally controlled then it can be persisted using StaticSql. Thus it is possible to have some definitions persisted using Profile and the remainder using StaticSql.

The definition data for Profile strategy will be retrieved first. Then, if configured true, definition data for StaticSql strategy will be retrieved second. There will always be some definitions persisted using the Profile strategy as there are some that are needed to boot-strap the system to know where to retrieve the definitions from when using StaticSql.

The definition data for StaticSql strategy will be stored in the database specified by the client. The definition data can only be retrieved automatically from one designated database. Hence, if definitions are stored in more than one database, then it will be necessary to retrieve the definitions from the other databases.

6. Persistance of Dynamic Object Instances by the Profile Strategy

Figure 10:
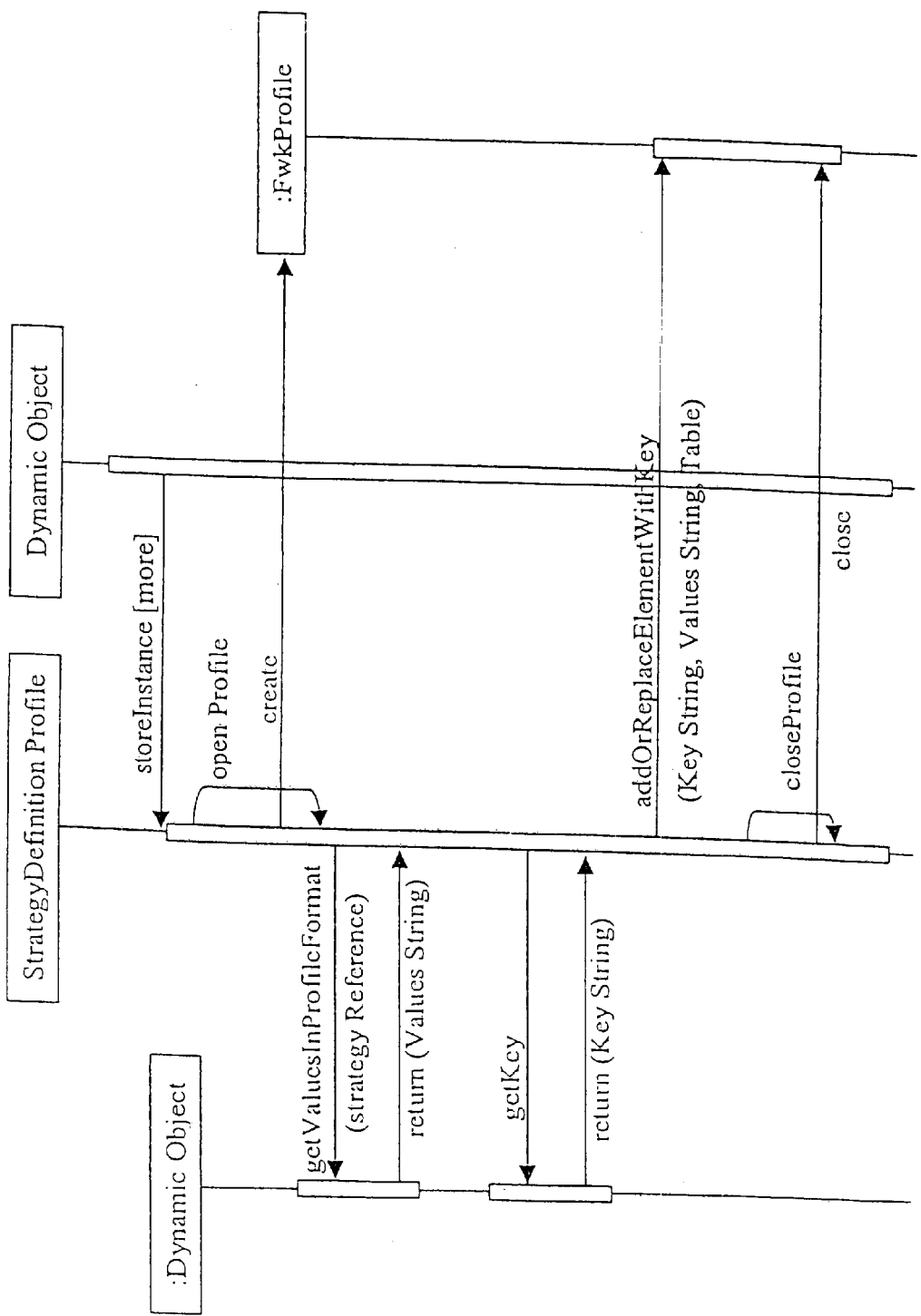
FIG. 10 is an object interaction diagram for a run-time store request.

Instances of dynamic objects are persisted at run-time in response to application service requests on the client and/or server. FIG. 10 shows the instantiated object interactions for a persistence action of "StoreAll", meaning all classes of dynamic object, where a Profile strategy has been defined.

The getValuesInProfileFormat interaction loops through all the attributes in a dynamic object counting the number of attribute positions. Then, it loops through from the fist to the number of attribute positions collecting attribute values. Because column names in the strategy definition are defined as a position number, if the current number is equal to the column number, then the attribute's value is added to the Profile format string.

Figure 11:
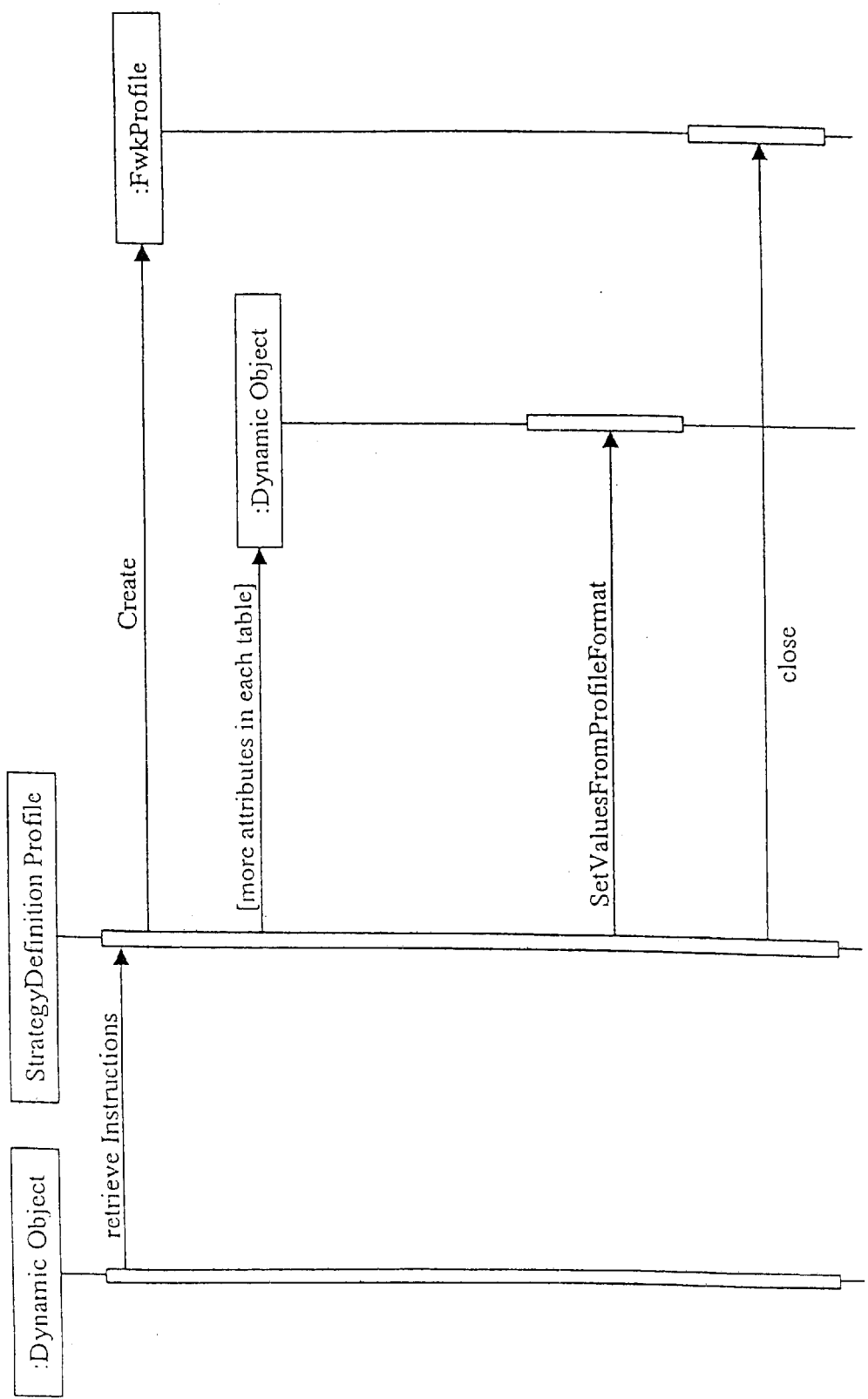
FIG. 11 is an object interaction diagram for a run-time retrieve request.

FIG. 11 shows the instantiated object interactions for the persistence action of "StoreAll". The getValuesFromProfileFormat interaction creates attributes for the newly created dynamic object using the Profile row string type and data.

7. Persistance of Dynamic Object Instances by Sql Strategies

The persistence of run-time instances of objects by the Sql strategies occurs in a similar manner to that described for the Profile strategy, subject to the following considerations.

Dynamic objects that are persisted using the StaticSql strategy type are persisted into a database (e.g. of DB2™ type) and into one DB2 table whose name and definition are known only to dynamic objects and not its users. This includes both definition and instance data.

The definition of this private DB2 table consists of the following columns:

TYPE/TABLE. This is one column but in the case of definition data it is referred to as TYPE and for instance data it is TABLE.

ID.

DATA.

The content of the TYPE column is a character string containing a value from:

DynamicObjectDefinition.

AttributeDefinition.

NamedAttributeDefinition.

NamedBLDefinition.

The content of the ID column is a string of characters. For example, for the dynamic object 'Customer', then ID='Customer'.

The content of the DATA column depends on the above TYPE.

The content of the TABLE column is the table name of the instances for a given type of dynamic object. It is not allowed to define two different types of dynamic objects and have instances of them persisted with the same value for TABLE.

The content of the ID column is the identifier of an instance of a given type of dynamic object.

The content of the DATA column is the values of the attributes of an instance.

Dynamic objects that are persisted using the DynamicSql strategy type are persisted into a DB2 database and a DB2 table that is defined by the user of dynamic objects. The table needs to be defined by the user before dynamic objects can be persisted into that table. Hence, dynamic objects are not capable of creating or deleting tables nor adding columns to a table, all of these types of table management functions are to be performed by a database administrator.

It is possible to store an instance of a dynamic object. To do this it is necessary to choose the name of a defined strategy for dynamic objects to determine how this instance is to be stored. Typical choices will be either maintenance or run-time.

Dynamic objects will perform the following steps to persist the instance:

1. Examine the strategy definition for the dynamic object, and:
   (i) Query the database name
   (ii) Query the strategy type. (Here, the persistence of an instance using the DynamicSql strategy is relevant, hence the strategy type will be DynamicSql.)
   (iii) Query the table name.
2. Open the DB2 database using the given database name.
3. Build a SQL statement dynamically that will attempt to insert a new row into the database. If the row exists then an update will be performed. (This technique is necessary as dynamic objects do not know whether an instance already persists or it is going to be persisted for the first time.)
4. For each defined attribute:
   (i) Query the column name.
   (ii) Query the attribute name.
   (iii) Query the attribute type. It is necessary to query the type to correctly build the SQL statement. For example, char columns need the value enclosed with quotation marks.
   (iv) Using the above attribute query data build the SQL statement to include column name and attribute value data, with the attribute value data formatted using the correct syntax for its type.

While the invention has been particularly shown and described with respect to preferred embodiments thereof, it will be understood by those skilled in the art that the foregoing and other changes in form and details may be made therein without departing from the spirit and scope of the invention.

Having thus described our invention, what we claim as new, and desire to secure by Letters Patent is:

1. A method for persisting objects to a database, the method comprising the steps of:
   (a) defining a meta-level object;
   (b) defining an object persistence strategy for said object for persistence of the object into a plurality of different persistent store types with a plurality of different persistance physical structures;
   (c) defining one or more attributes for said objects;
   (d) defining an attribute persistence strategy for one or more of said attributes;
   (e) instantiating the object, said object carrying the object persistence strategy and one or more of the attributes, each of the carried attributes having one or more attribute persistence strategies; and (f) servicing said instantiated object.

2. The method of claim 1, whereby said persistence strategy includes both storage and retrieval actions.

3. A method, in a computer network system, for specifying a persistance framework for objects, the method comprising the steps of:

(a) defining, in said system, a meta-level object;

(b) defining, in said system, a persistence strategy for said object for persistence of the object into a plurality of different persistent store types with a plurality of different persistence physical structures;

(c) defining, in said system, one or more attributes for said object; and (d) defining, in said system, a persistence strategy for one or more of said attributes.

4. The method of claim 3, whereby said persistence strategy includes both storage and retrieval actions.

5. The method of claim 4, comprising the further steps of:

(e) for each said persistence strategy, defining separate strategies for definition time and run time.

6. An object persistence framework, in a computer network system, comprising:

means, in said system, providing an object definition;

means, in said system, providing an object persistence definition for the object for persistence of the object into a plurality of persistence store types with a plurality of different persistence physical structures;

means, in said system, providing one or more attributes for each object; and means, in said system, providing a persistence strategy definition for one or more of said attributes.

7. The framework of claim 6, further comprising an intermediary definition linking said object definition with said attribute definitions.

8. The framework of claim 7, further comprising one or more additional object definitions associated with the first object definition, each said additional object definition having respective persistence definitions and attributes.

9. A client-server computing system, comprising:

(a) a plurality of client computers each having
processor means implementing an application layer, and a memory storing a set of meta-level objects, a persistence strategy definition for each said object for persistence of the object into a plurality of persistent store types with a plurality of different persistence physical structures, one or more attributes for each said object, and a persistence strategy for one or more of said attributes;

(b) a plurality of server computers, each having processor means implementing an application layer, and a memory storing a set of meta-level objects, a persistence strategy definition for each said object, one or more attributes for each said object, and a persistence strategy for one or more of said attributes;

(c) a database being accessible by said server computers; and (d) a communications link interconnecting said
client machines with said server machines; and
wherein, in response to a persistence command, one or either said client computers and/or server computers instantiates an object from amongst said set that carries with said object (i) the object's persistence strategy and its attributes with their respective persistence strategies, to be persisted in said database.

\* \* \* \* \*

UNITED STATES PATENT AND TRADEMARK OFFICE
CERTIFICATE OF CORRECTION

PATENT NO.    : 6,591,277 B2  Page 1 of 1
DATED         : July 8, 2003
INVENTOR(S)   : Stephen Kurlow et al.

It is certified that error appears in the above-identified patent and that said Letters Patent is hereby corrected as shown below:

<u>Column 12,</u>
Line 32, "its" should read -- the objects --

Signed and Sealed this

Twenty-fifth Day of November, 2003

JAMES E. ROGAN
*Director of the United States Patent and Trademark Office*